(12) United States Patent
Kanamori et al.

(10) Patent No.: US 6,365,526 B1
(45) Date of Patent: Apr. 2, 2002

(54) OPTICAL ILLUMINATION SYSTEM AND PROJECTION APPARATUS

(75) Inventors: Tatsuru Kanamori, Saitama; Kenji Sugihara, Chiba; Koji Kita; Makoto Shinoda, both of Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/687,570

(22) Filed: Oct. 13, 2000

(30) Foreign Application Priority Data

Oct. 15, 1999 (JP) .......................................... 11-294388

(51) Int. Cl.$^7$ .......................................... H01L 21/302
(52) U.S. Cl. .............................. 438/748; 349/5; 349/10; 349/210; 353/94; 353/102; 353/599
(58) Field of Search .............................. 349/5, 10, 210; 353/94, 102, 599; 438/748

(56) References Cited

U.S. PATENT DOCUMENTS 5,098,184 A * 3/1992 Van Den Brandt et al. . 353/102

| | | | |
|---|---|---|---|
| 6,191,891 B1 * | 2/2001 | Pellicori ...................... 359/599 |
| 6,219,112 B1 * | 4/2001 | Yoneyama et al. ............ 349/5 |
| 6,224,217 B1 * | 5/2001 | Tanaka ........................ 353/94 |

* cited by examiner

Primary Examiner—Richard Elms
Assistant Examiner—Pho Luu
(74) Attorney, Agent, or Firm—Jay H. Maioli

(57) ABSTRACT

An optical illumination system wherein an increased amount of light from a light source can reach a light valve, in which a luminous flux of the light source is irradiated upon a first lens array. The luminous flux having passed through the first lens array is introduced to the polarization conversion system provided immediately before a second lens array, and a luminous flux coming out from the polarization conversion system is introduced to the second lens array and then irradiated upon the light valve. The first lens array has an image forming position f which satisfies $$S<f<L$$

where L is an optical path length of a longer one of optical paths of P polarized light and S polarized light decomposed from the luminous flux from the light source by the polarization conversion system and S is an optical path length of a shorter one of the optical paths.

6 Claims, 14 Drawing Sheets

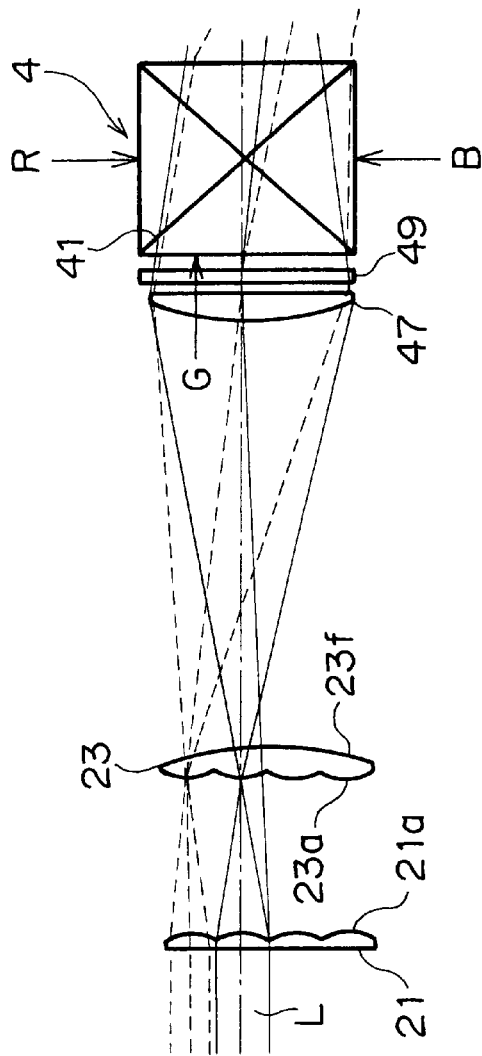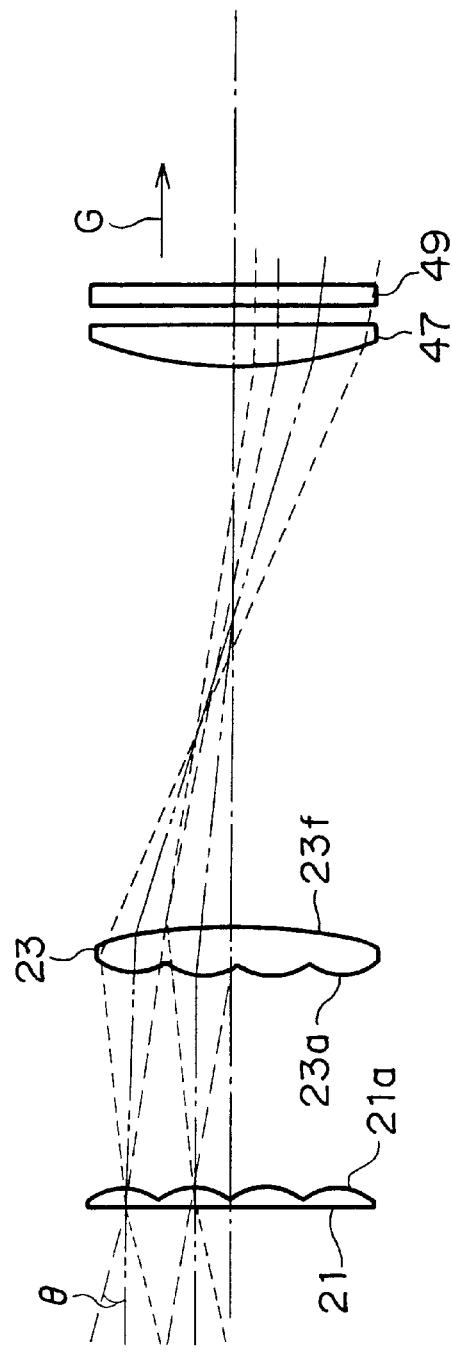
F I G. 2
F I G. 3

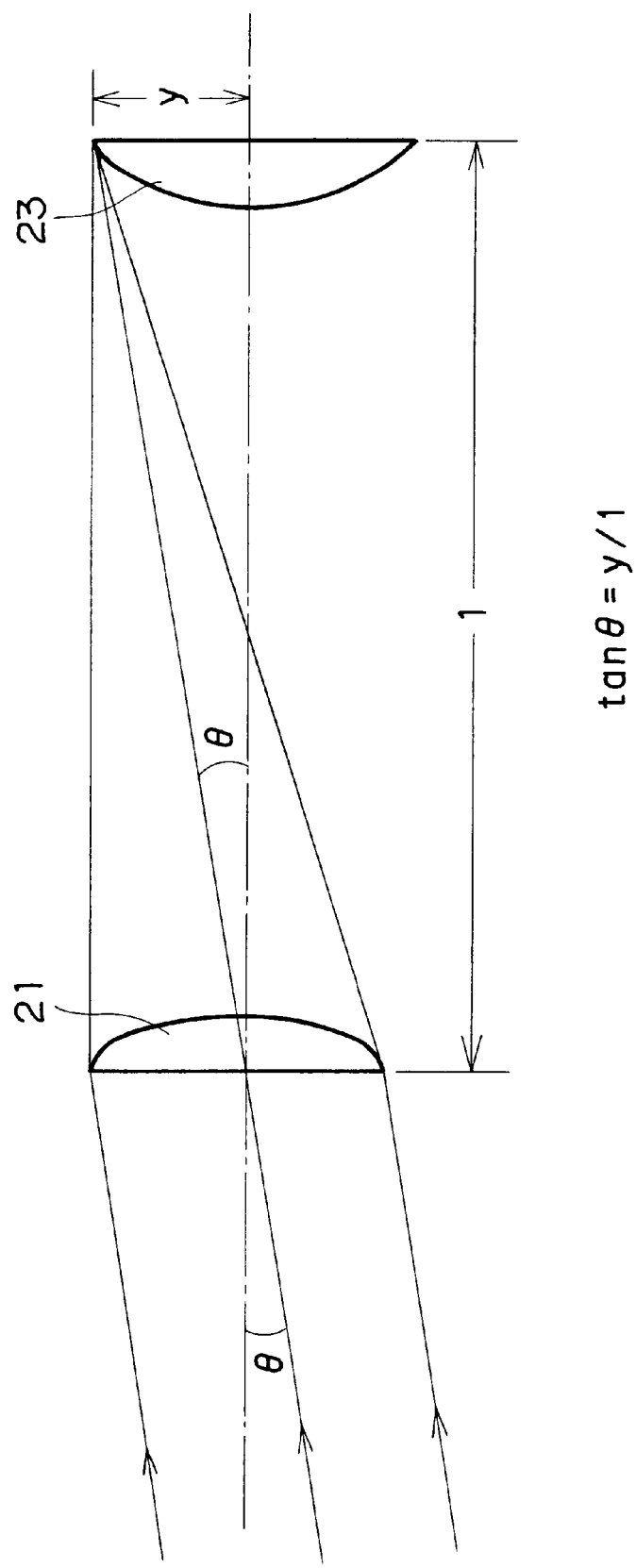

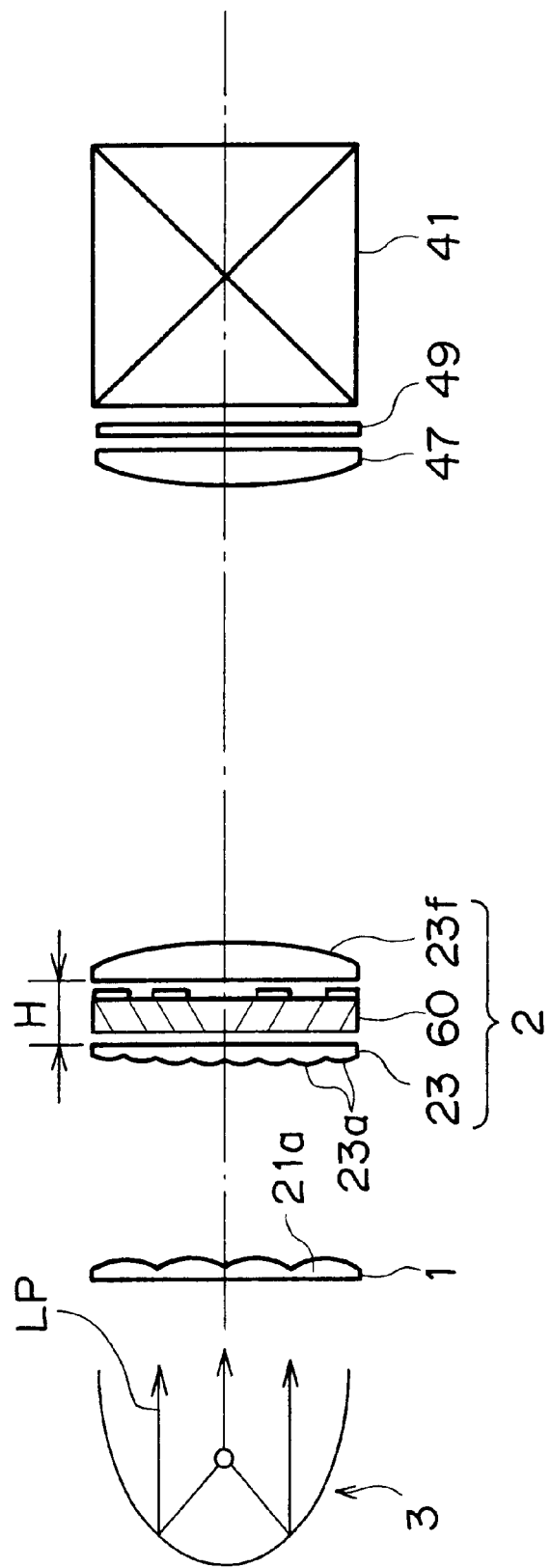

OPTICAL ILLUMINATION SYSTEM AND PROJECTION APPARATUS

BACKGROUND OF THE INVENTION

This invention relates to an optical illumination system which can efficiently irradiate light upon a light valve (display device) such as, for example, a liquid crystal display panel and a projection apparatus which includes an optical illumination system of the type mentioned.

Recently, display apparatus such as a projector apparatus, a television receiver and a display unit for a computer which use, for example, an optical element such as a liquid crystal display panel which is a light valve have been popularized in wide fields.

Such a projection apparatus which uses a liquid crystal display panel as described above spectrally decomposes light emitted from a light source into lights of the primary colors and introduces the lights of the primary colors into the liquid crystal display panel. The liquid crystal display panel optically modulates the lights of the primary colors with a video signal inputted thereto and composes the modulated lights of the primary colors to produce a color video signal.

The color video signal is projected in an enlarged scale onto a screen through a projecting lens.

In an optical system of such display apparatus as described above, an ultra high pressure mercury lamp, a metal halide lamp and so forth are used frequently as a light source due to their favorable color rendering properties.

The light sources mentioned, however, do not form an ideal point source of light and emit a luminous flux which has a large divergence angle.

Meanwhile, it is demanded that an illumination optical system used for an optical system to which the present invention is applied can irradiate a luminous flux emitted from a light source upon a liquid crystal display panel efficiently and uniformly.

However, a luminous flux generated by a light source used popularly has a large divergence angle as described above.

Therefore, it is difficult for a luminous flux emitted from the light source to be irradiated efficiently upon the liquid crystal display panel.

As means for causing a luminous flux emitted from a light source and having a large divergence angle in this manner to be irradiated efficiently upon a liquid crystal display panel, it is conventionally known, for example, to use a lens array having a structure which includes a large number of small lenses arranged in a grid-like arrangement or a like element to converge a luminous flux to reach the liquid crystal display panel with a uniform illuminance distribution.

An example of a typical projection apparatus which uses a lens array of the type described above is described below with reference to FIG. 1.

A light source 3 includes, for example, an ultra high pressure mercury lamp 3b disposed at a focal position of a paraboloid mirror 3a and emits a luminous flux having a predetermined convergence angle through an aperture thereof.

Of the luminous flux emitted from the light source 3, unnecessary rays of light in an infrared region (IR) and an ultraviolet region (UV) are intercepted by an UV/IR cut filter 5 while only effective rays of light are introduced into a first optical block 1 positioned rearwardly of the aperture of the light source 3.

The first optical block 1 is composed of an optical element including a first lens array 21 on which a plurality of convex cell lenses 21a having an outer profile substantially similar to an aspect ratio of effective apertures of liquid crystal display panels 45, 49 and 53 as light valves (optical spatial modulation elements) are arranged in a grid-like arrangement.

A second lens array 23 of a second optical block 2 disposed rearwardly of the first optical block 1 has a plurality of convex cell lenses 23a formed on the incoming side thereof and has a single convex surface 23f formed on the outgoing side thereof and serving as a first condensing component.

A pair of dichroic mirrors 14 and 27 for decomposing light emitted from the light source 3 into color lights of red, green and blue are disposed between the second lens array 23 and the effective apertures of the liquid crystal display panels 45, 49 and 53.

In the arrangement shown in FIG. 1, the red light R is reflected by the dichroic mirror 14 while the green light G and the blue light B are transmitted through the dichroic mirror 14. The red light R reflected by the dichroic mirror 14 has an advancing direction which is bent by 90 degrees by a mirror 15, and is then converged by a condensing lens 51 and introduced into the liquid crystal display panel 53 for red.

Meanwhile, the green light G and the blue light B having been transmitted through the dichroic mirror 14 are decomposed by the dichroic mirror 27. In particular, the green light G is reflected by the dichroic mirror 27 so that its advancing direction is bent by 90 degrees, and is introduced into the liquid crystal display panel 49 for green through a condensing lens 47. Meanwhile, the blue light B is transmitted through the dichroic mirror 27 and advances straightforwardly, and is introduced into the liquid crystal display panel 45 for blue by relay lenses 29 and 33, a condensing lens 43 and mirrors 31 and 35.

A polarizing plate (not shown) for polarizing incoming light to a fixed polarization direction is disposed on the incoming side of each of the liquid crystal display panels 45, 49 and 53, and another polarizing plate (not shown) which only transmits outgoing light having a predetermined polarization plane is disposed rearwardly of each of the liquid crystal display panels 45, 49 and 53. Each of the liquid crystal display panels 45, 49 and 53 thus modulates the intensity of light with a voltage of a circuit for driving liquid crystal.

The lights of the colors optically modulated by the liquid crystal display panels 45, 49 and 53 are composed by a dichroic prism 41 serving as optical composing means. The dichroic prism 41 reflects, with its reflecting face 41a, the red light R and reflects, with its reflecting face 41b, the blue light B both toward a projection lens 13.

Meanwhile, the green light G is transmitted through the reflecting faces 41a and 41b. Consequently, the red light R, green light G and blue light B are composed into a single luminous flux on an optical axis and projected in an enlarged scale to a screen 102 by the projection lens 13.

Now, a configuration of the lens arrays 21 of the first optical block 1 and the lens arrays 23 of the go second optical block 2 is described in more detail with reference to FIGS. 2 and 3.

First, FIG. 2 illustrates an example of formation of a luminous flux principally by an optical characteristic of the first optical block 1. A luminous flux L emitted from a light source is decomposed by the individual cell lenses 21a of the first lens array 21 and forms, after it goes out from the first optical block 1, images corresponding to the cell lenses 21a of the first lens array 21 in the proximity of the second optical block 2. Thereafter, the luminous flux is introduced into the condensing lens 47, which serves as a second condensing component, by the convex surface 23f of the second lens array 23. An image of the light source is reformed in the proximity of the pupil of the projection lens 13 shown in FIG. 1 by the condensing lens 47.

It is to be noted that reference numerals 41 and 49 denote a dichroic prism and a crystal display panel, respectively.

FIG. 3 illustrates an example of formation of a luminous flux by the second optical block 2. The divergence angle θ with which a luminous flux can be taken in by the illumination system is controlled by suitably setting the outer profile dimensions of the cell lenses 23a and the distance between the first lens array 21 and the second lens array 23.

The thus taken in luminous flux within the divergence angle is introduced into the condensing lens 47, which serves as a second condensing component, by the convex surface 23f which serves as a first light condensing component. Consequently, the composed condensed light components composed from the first condensing component and the second condensing component are irradiated efficiently and uniformly upon the liquid crystal display panel 49 by the condensing lens 47.

The luminous flux emitted, for example, from a light source and introduced into the condensing lens 47 which serves as a second condensing component as described above is modulated by the liquid crystal display panel 49 having polarizing plates on the front and the rear thereof. Then, the modulated luminous flux is introduced into a color composing element such as, for example, the dichroic prism 41.

It is to be noted that the light which passes through the convex surface 23f serving as a first condensing component and is inputted to the condensing lens 47 serving as a second condensing component is the green light G of the light which has been decomposed intermediately into the red light R, green light G and blue light B by the optical element such as a dichroic mirror not shown as described hereinabove.

The dichroic prism 41 shown in FIG. 1 is formed from four prisms which are adhered to each other at reflecting faces 41a and 41b thereof, each of which is formed from a thin film having a predetermined reflection characteristic.

In FIGS. 1 and 2, only an optical path of the green light G is indicated by a sold line. Meanwhile, the red light R and the blue light B are introduced into the dichroic prism 41 from different directions from each other as indicated by arrow marks after they are optically modulated similarly by the liquid crystal display panels for the respective colors.

The green light G modulated by the liquid crystal display panel 49 is transmitted as it is through the dichroic prism 41, and the red light R introduced to the dichroic prism 41 is reflected by the reflecting face 41a while the blue light B introduced to the reflecting face 41b is reflected by the reflecting face 41b. In other words, the red light R, green light G and blue light B are composed by the dichroic prism 41 into a color video signal, which is introduced into the projection lens 13.

Since the first and second lens arrays 21 and 23 on which the convex cell lenses 21a and 23a are arranged in a grid-like arrangement are provided rearwardly of the light source in this manner, light emitted from the light source can be irradiated more efficiently and more uniformly upon the effective aperture of the liquid crystal display panel 45 (49, 53) than where only a condenser lens is disposed.

FIGS. 4A and 4B show an example of aspect ratios (ratio between the horizontal length and the vertical length) of the cell lenses 21a to 21d of the first lens array 21 and the cell lenses 23a, 23b, 23c and 23d of the second lens array 23. The aspect ratios are set, for example, 16:9. The aspect ratio of the cell lenses 21a, 21b, 21c and 21d is substantially equal to the aspect ratios of the liquid crystal display panels 45, 49 and 53 of FIG. 1 which are light valves and the aspect ratio of the screen 102 of FIG. 1.

Now, a relationship among the divergence angle with which a luminous flux can be taken in, the distance between the first and second lens arrays and the cell lens size of the second lens array is described with reference to FIG. 5.

Where the size of the cell lenses 23a of the second lens array 23 is represented by y and the distance between the first and second lens arrays is represented by 1 as seen in FIG. 5, the convergence angle θ with which a luminous flux can be taken in is given by Tan θ=y/l. Where only the first and second lens arrays are provided in this manner, the divergence angle with which a luminous flux can be taken in depends only upon the distance between the first and second lens arrays and the cell lens size y of the second lens array.

In order to cause light emitted from the light source to be irradiated efficiently upon a liquid crystal display panel 45, a polarization conversion system is used popularly.

FIG. 6 shows an illumination optical system when a polarization conversion system 60 is used.

Referring to FIG. 6, light emitted from the light source 3 passes through the first optical block 1 formed from the first lens array and is irradiated upon the polarization conversion system 60, whereafter it is outputted toward the condensing lens 47 by the second optical block 2 which is formed from the second lens array.

The polarization conversion system 60 includes, as hereinafter described, a polarizing beam splitter, a reflecting face, and a λ/2 plate for converting the polarization direction of light. When light emitted from a light source and having random polarization planes is introduced at a predetermined angle to the polarizing beam splitter, P polarized light waves are transmitted through the polarizing beam splitter while S polarized light waves are reflected to the direction of the optical axis again by the reflecting face so that they thereafter advance along the optical axis. By disposing a λ/2 plate on only one of the optical paths of the thus decomposed P polarized light and S polarized light, the polarization plane of only one of the P polarized light and the S polarized light can be rotated, and consequently, the polarization planes of all of the P polarized light and the S polarized light can be made coincide with each other.

The light outputted from the polarization conversion system 60 and having the uniform polarization plane is irradiated upon the liquid crystal display panel 49. Consequently, light emitted from the light source can be irradiated efficiently upon the liquid crystal display panel by making most of such light components which have conventionally been absorbed by a polarizing plate.

As the location of the polarization conversion system 60, it may be disposed between the light source and the first optical block, in the proximity of the second optical block 2, or the like. Preferably, however, the polarization conversion system 60 is disposed in the proximity of the second optical block 2 from a point of view of the utilization efficiency of light as seen in FIG. 6.

In an illumination optical system wherein such an ultra high pressure mercury lamp, a metal halide lamp or the like as described above is used as a light source, in order to efficiently utilize a luminous flux emitted from a light source, it is necessary to efficiently take in a luminous flux of a predetermined divergence angle of a lamp.

Such taking in of a luminous flux of the divergence angle is controlled by the distance between the first lens array and the second lens array and the size of the cell lenses of the second lens array as described above.

However, in order to efficiently utilize a luminous flux emitted from the light source, it is necessary to dispose the polarization conversion system 60 described above in the proximity of the second lens array as shown in FIG. 6. As a result, a plurality of aperture limits are produced in the proximity of the second lens array as seen in FIGS. 7A to 7C, and the convergence angle with which a luminous flux can be taken in is limited. Further, since S polarized light which is reflected by the polarizing beam splitter of the polarization conversion system has an optical path which is bent by the polarizing beam splitter and the reflecting face, the optical path length of the S polarized light is longer than the optical path length of P polarized light which is transmitted through the polarizing beam splitter. This provides a difference in divergence angle with which a luminous flux can be taken in between the P polarized light path and the S polarized light path. As a result, a luminous flux of a sufficient divergence angle cannot taken in with one of the P polarized light path and the S polarized light path. This deteriorates the light utilization efficiency of the optical system.

This is described more particularly with reference to FIGS. 7A to 7C.

If the polarization conversion system 60 is disposed in front of a cell lens 23a of the second lens array, then the size of the cell lens 23a becomes one half that of a cell lens 21a of the first lens array as seen in FIGS. 7A to 7C. Further, a plurality of apertures are produced by the polarization conversion system 60 in addition to the aperture of the cell lens 23a of the second lens array, and the divergence angle with which a luminous flux can be taken in is limited by the plurality of apertures.

For example, if the image forming position f of the cell lens of the first lens array is set on the aperture which is closest to the first lens array, then only a luminous flux of a region A from within a luminous flux of a divergence angle θ1 inputted to a maximum aperture can be transmitted through the optical system as seen in FIG. 7A.

Then, if the image forming position f of the cell lens of the first lens array is set on the aperture which is positioned closest to the liquid crystal display panel, then only luminous fluxes in regions B and C from within a luminous flux of a divergence angle θ2 inputted to the maximum aperture can be transmitted through the optical system as seen in FIG. 7B.

Further, also where the optical path of the polarization conversion system 60 is shorter as in FIG. 7C, if the image forming position of the cell lens of the first lens array is provided nearer to the liquid crystal panel, then light in the region A from within light whose divergence angle is greater than θ3 cannot still be transmitted through the polarization conversion system 60.

In the illumination optical system which uses only part of a luminous flux which is transmitted through the first lens array in this manner, color irregularity occurs on the liquid crystal display panel from irregularity of illuminance on the liquid crystal display panel or unevenness of an incoming ray of light to the dichroic mirror disposed adjacent the first condensing component with respect to the liquid crystal display panel. Consequently, the luminous flux which can be utilized effectively is that luminous flux which can be transmitted through the entire face of the first lens array and can be transmitted through the polarization conversion system and the second lens array.

SUMMARY OF THE INVENTION

It is an object of the present invention to provide an optical illumination system and a projection apparatus wherein light can be irradiated efficiently upon a display device such as, for example, a liquid crystal display panel.

In the optical illumination system of the present invention, a luminous flux from a light source is irradiated upon a light valve, which forms a display apparatus, through an optical apparatus for illumination.

A first optical block of the optical apparatus for illumination includes a first lens array.

The first lens array has a plurality of cell lenses having a substantially similar shape to that of the light valve.

A second optical block has a second lens array and a polarization conversion system. The second lens array has a plurality of cell lenses and corresponds to the first lens array of the first optical block.

A first condensing component of the second optical block condenses a luminous flux having been transmitted through the second lens array toward the light valve.

A second condensing component is disposed in the proximity of the light valve in order to form an image of a luminous flux outputted from the second optical block at a predetermined position.

In this instance, where the optical path length of a shorter one of optical paths of P polarized light and S polarized light decomposed by the polarization conversion system is represented by S and the optical path length of a longer one of the optical paths is represented by L, the image forming position f of the first lens array is set so as to satisfy $$S<f<L$$

Consequently, in such an optical system as described above, a luminous flux of a possible maximum divergence angle can be taken in, and also the difference in divergence angle between the S polarized light path and the P polarized light path can be reduced. Consequently, a luminous flux emitted from the light source can be utilized effectively.

With the optical illumination system, since the focal position f of the first lens array positioned adjacent the light source is set so as to satisfy $S<f<L$, the divergence angle from the light source can be increased, and consequently, there is an advantage that a uniform image forming performance can be obtained while preventing loss or irregularity of the light amount.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 2 is a diagrammatic view illustrating an arrangement of optical elements when light of a light source is irradiated upon a display panel;

FIG. 3 is a diagrammatic view illustrating a divergence angle of a luminous flux limited by first and second cell lens arrays;

FIG. 5 is a diagrammatic view showing a luminous flux limited by the first and second cell lenses;

FIGS. 12A, 12B and 12C are diagrammatic views illustrating a divergence angle when a luminous flux which can be transmitted through apertures of first and second cell lens arrays and a polarization conversion system from a light source can be taken in;

FIG. 13 is a diagrammatic view showing an optical illumination system wherein the polarization conversion system is positioned adjacent a liquid crystal display panel with respect to the second lens array;

DETAILED DESCRIPTION OF THE PREFERRED EMBODIMENTS

Figure 1:
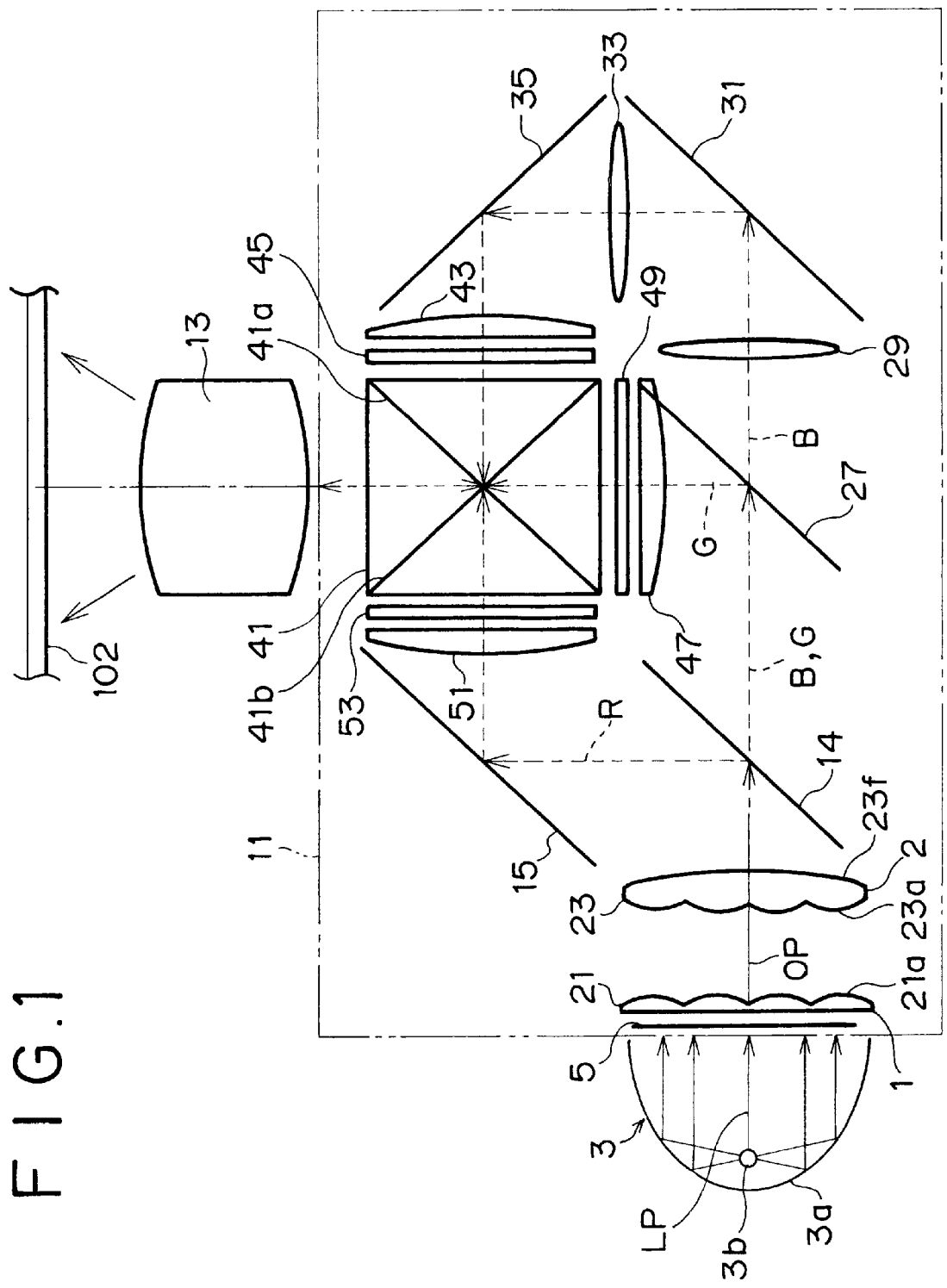
FIG. 1 is a schematic view illustrating an arrangement of optical elements of a conventional projection apparatus.
Figure 4A:
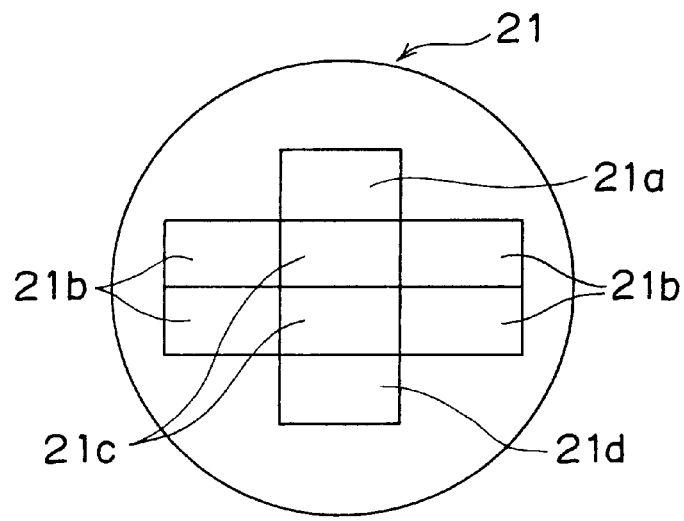
FIGS. 4A and 4B are schematic views showing outer profiles of first and second cell lenses.
Figure 4B:
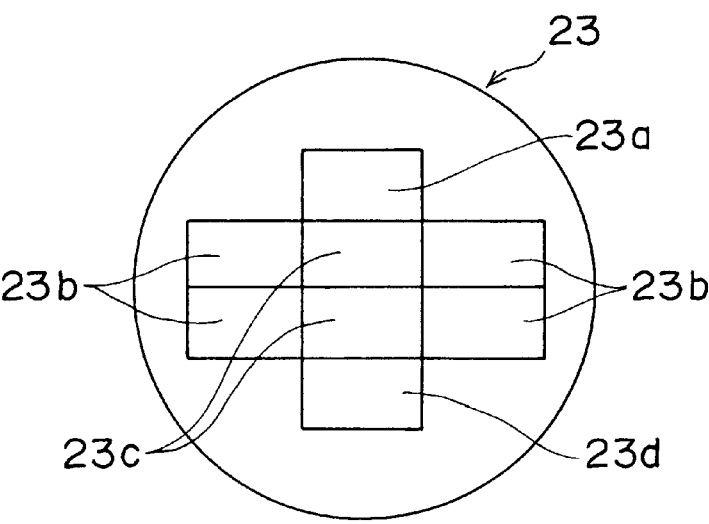
Figure 6:
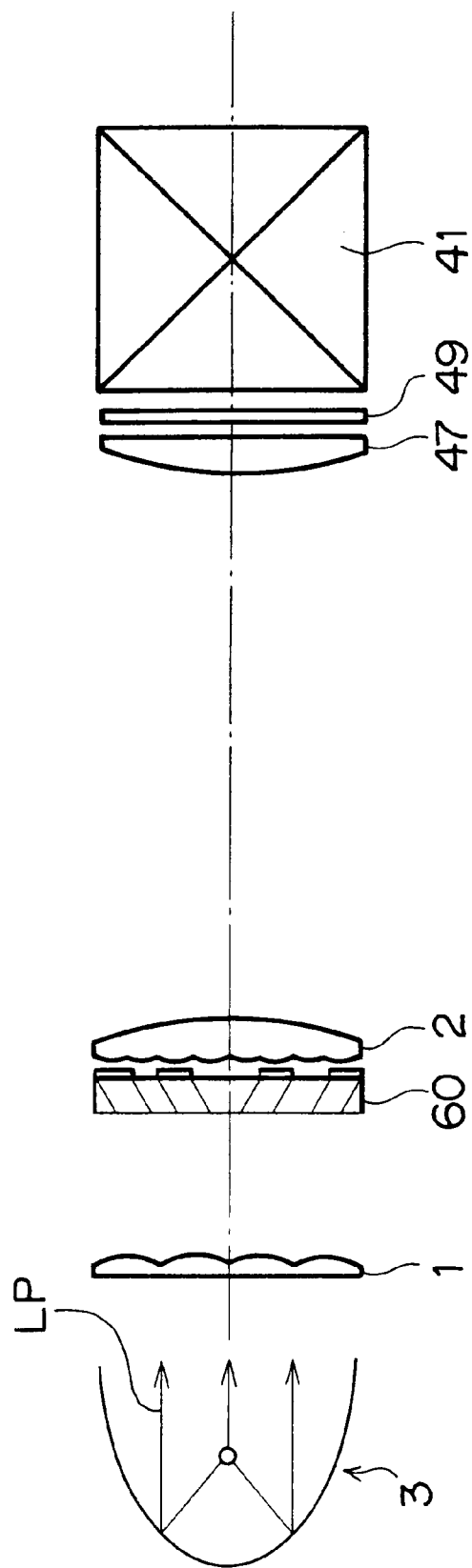
FIG. 6 is a diagrammatic view illustrating an arrangement of a polarization conversion system and the first and second lens arrays.
Figure 7:
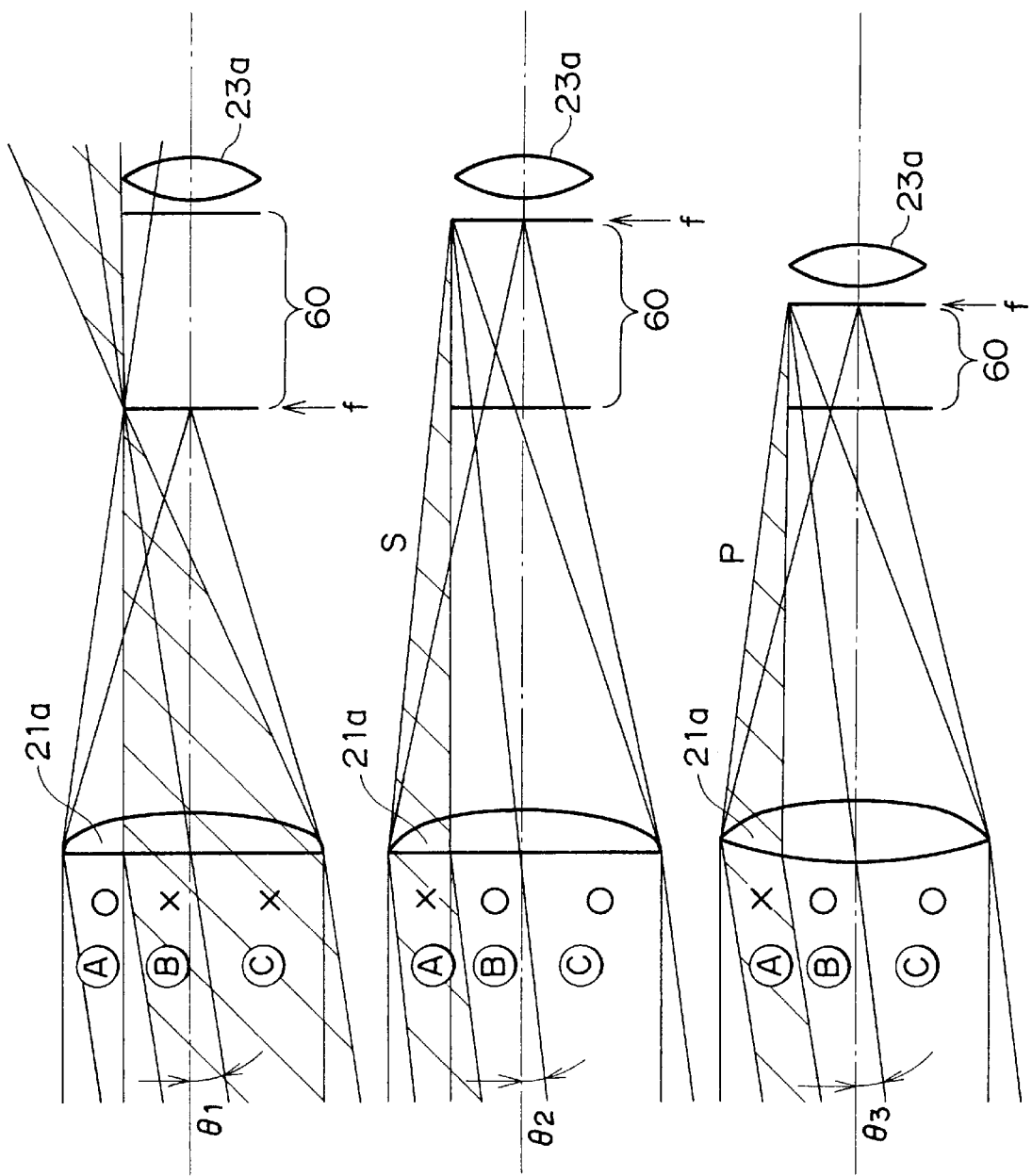
FIGS. 7A, 7B and 7C are diagrammatic views illustrating light which cannot be taken in depending upon a focus position of a cell lens array.
Figure 8:
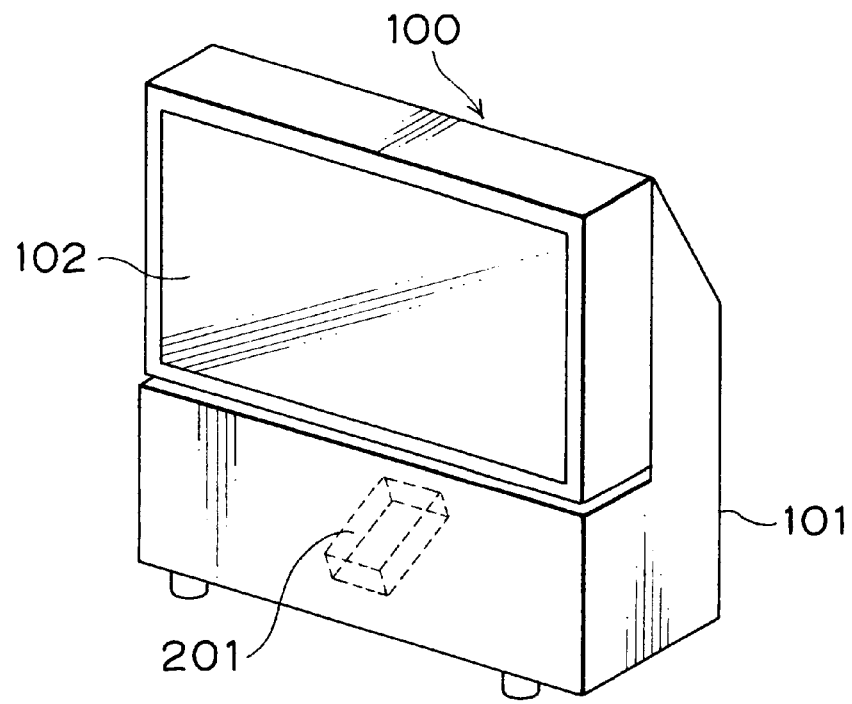
FIG. 8 is a perspective view showing an outline of a television set of the projection type to which the present invention can be adapted.
Figure 9:
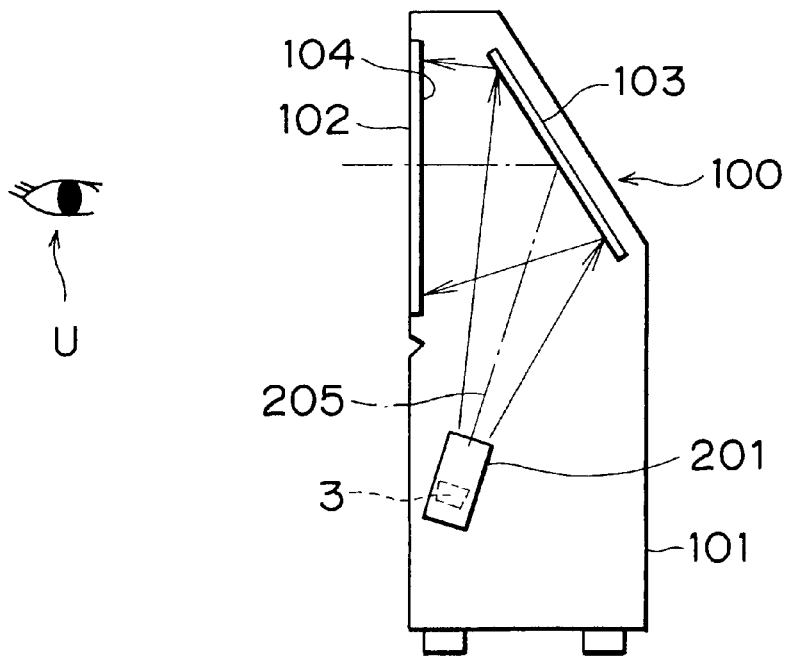
FIG. 9 is a schematic side elevational view showing an internal structure of the television set of the projection type.

FIG. 8 shows an appearance of a television set 100 of the projection type which includes a projection apparatus 201 having a preferred form of an optical apparatus of the present invention, and FIG. 9 shows an internal structure of the liquid crystal television set 100 of the rear projection type including the projection apparatus 201 of FIG. 8. The television set 100 is referred to also as liquid crystal projector apparatus.

A general structure of the television set 100 is described first. Referring to FIGS. 8 and 9, the television set 100 includes a cabinet 101, a screen 102, a mirror 103 and the projection apparatus 201 built therein.

Projection light 205 to be projected by the projection apparatus 201 using light of a light source 3 is reflected by the mirror 103 and projected to a back face 104 of the screen 102.

An image projected to the screen 102 can be observed as a color image or a monochrome image on the screen 102 by a user.

In the following description, it is assumed that a color image can be displayed on the screen 102.

Figure 10:
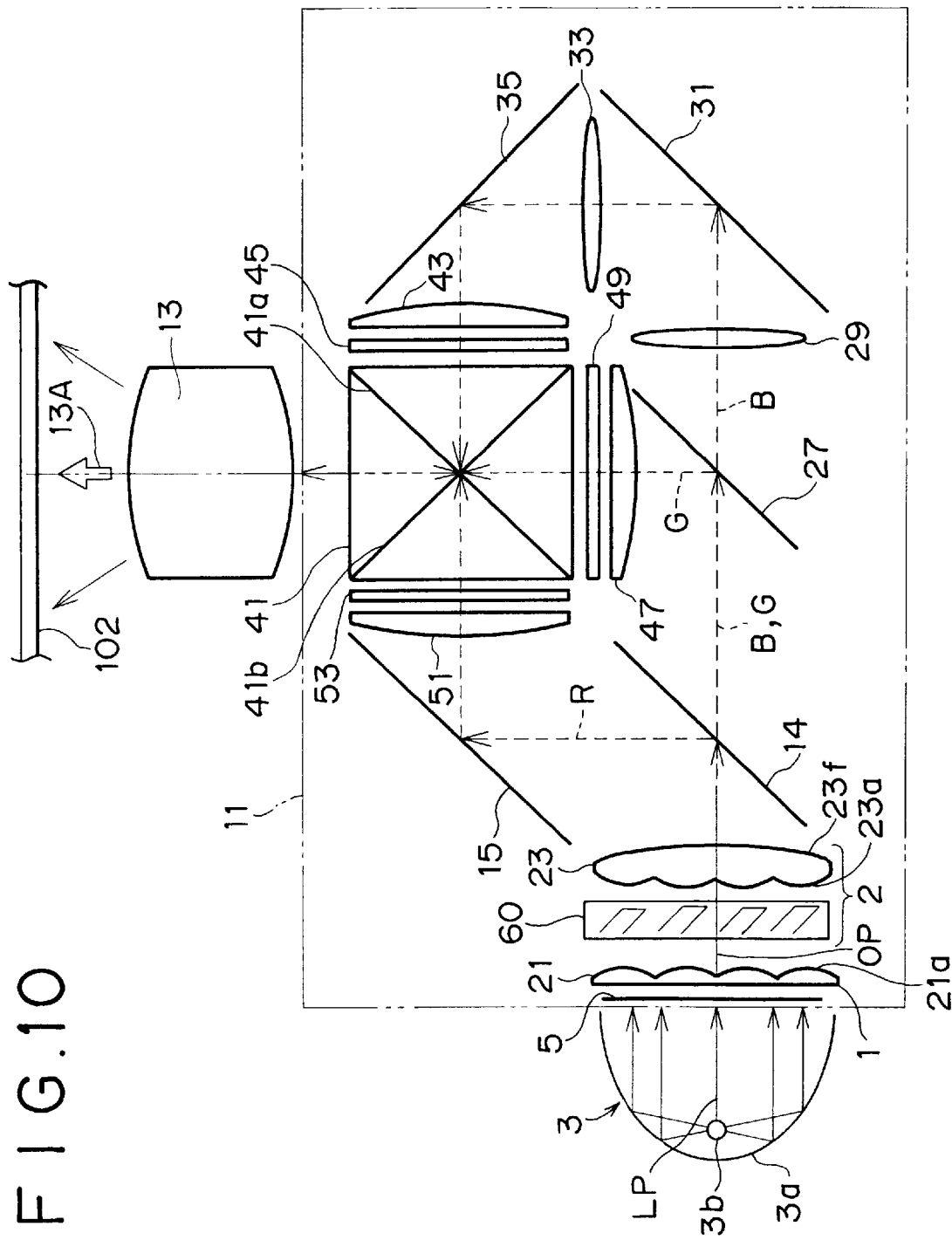
FIG. 10 is a diagrammatic view showing an example of an arrangement of optical elements of a projection apparatus.

Referring to FIG. 10, the projection apparatus 201 includes the light source 3 and a projection lens 13. The light source 3 and the projection lens 13 are removably mounted on a body of an optical apparatus 11.

The light source 3 includes a paraboloid mirror 3a having, for example, a paraboloid face and a lamp 3b. A metal halide lamp, a halogen lamp or the like can be used for the lamp 3b. Meanwhile, the projection lens 13 is so structured that composed light (color image light) introduced from the optical apparatus 11 can be focused on the back face 104 of the screen 102 of FIG. 9.

Now, an optical system of the optical apparatus 11 is described with reference to FIG. 10.

A filter 5, a first optical block 1 and a second optical block 2 are disposed in the proximity of the light source 3. The filter 5, first optical block 1 and second optical block 2 are disposed in parallel to each other and perpendicularly to an optical axis OP of light (a luminous flux) LP going out from the light source 3.

Each of a first lens array 21 of the first optical block 1 and a second lens array 23 of the second optical block 2 includes a large number of lenses, for example, of a rectangular shape gathered in a plane and uniforms the light LP having passed through the filter 5 to supply illumination light to liquid crystal display panels 45, 49 and 53 so as to be sent to the projection lens 13. A polarization conversion system 60 of the second optical block 2 converts a randomly polarized luminous flux emitted from the light source 3 into a luminous flux having a single polarization direction.

The luminous flux L having passed through the filter 5, first optical block 1 and second optical block 2 includes red light R, green light G and blue light B as described hereinabove, and the optical system described below decomposes the luminous flux L into red light R, green light G and blue light B, optically modulates the red light R, green light G and blue light B and composes the lights of the primary colors to produce composed light 13A as color image light on the projection lens 13 side.

Dichroic mirrors 14 and 27, a relay lens 29 and a mirror 31 are disposed along the straightforward optical axis OP. A mirror 15 is disposed corresponding to the dichroic mirror 14 along another optical axis perpendicular to the optical axis OP. A condensing lens (second condensing component) 51 and a liquid crystal display panel 53 which serves as a light valve are disposed along an optical axis of light reflected by the mirror 15.

The condensing lens (second condensing component) 47 and a liquid crystal display panel 49 which serves as a light valve are disposed corresponding to the dichroic mirror 27.

A relay lens 33 and a mirror 35 are disposed corresponding to the mirror 31. A condensing lens (second condensing component) 43 and a liquid crystal display panel 45 which serves as a light valve are disposed on an optical axis of light reflected from the mirror 35.

A dichroic prism 41 which may be referred to as optical composing member, composing optical element or cross prism is disposed corresponding to the liquid crystal display panels 53, 49 and 45. The projection lens 13 is positioned corresponding to the dichroic prism 41.

The dichroic mirrors 14 and 27 have a light reflection characteristic and a light transmission characteristic of reflecting and transmitting light depending upon the wavelength.

The red light R of the luminous flux L of FIG. 10 is reflected by the dichroic mirror 14 and sent to the mirror 15 side while the green light G and the blue light B of the luminous flux L are transmitted through the dichroic mirror 14 and sent to the dichroic mirror 27 side. The green light G is reflected by the dichroic mirror 27 and sent to the condensing lens 47 and the liquid crystal display panel 49. The blue light B passes through the dichroic mirror 27 and then through the relay lenses 29 and is reflected by the mirror 31, whereafter it passes through the relay lens 33 and is reflected by the mirror 35 and then transmitted through the condensing lens 43 and the liquid crystal display panel 45.

The red light R reflected by the mirror 15 passes through the condensing lens 51 and the liquid crystal display panel 53 and is supplied to the dichroic prism 41.

Now, the dichroic prism 41 shown in FIG. 10 is described. The dichroic prism 41 composes the red light R, blue light B and green light G to produce composed light 13A. The dichroic prism 41 is formed from four prisms 41A, 41B, 41C and 41D of an isosceles right triangular cross section adhered to each other with a bonding agent. An optical thin film 41a or/and 41b having a predetermined optical transmission characteristic and optical reflection characteristic are formed on one or two of faces of each of the prisms 41A, 41B, 41C and 41D. The thin films (optical multilayer films) 41a and 41b having the optical transmission characteristic and the optical reflection characteristic determined in advance in this manner are formed on the faces of the prisms 41A, 41B, 41C and 41D to be adhered to each other.

The prisms 41A to 41D of the dichroic prism 41 are made of a plastic material or glass with an isosceles right triangular cross section.

Now, a route along which the light LP generated by the lamp 3b of the light source 3 comes to the screen 102 is described briefly with reference to FIG. 10.

The light LP generated by the lamp 3b passes the filter 5, which thereupon removes unnecessary rays of light (infrared rays and ultraviolet rays) from the light LP to make light L. Of the light L, the red light R is reflected by the dichroic mirror 14 and further by the mirror 15, passes through the condensing lens 51 and the liquid crystal display panel 53 and then is reflected by the optical thin film 41a of the dichroic prism 41.

Meanwhile, the green light G and the blue light B of the light L pass through the dichroic mirror 14, and the green light G is reflected by the dichroic mirror 27, passes through the condensing lens 47 and the liquid crystal display panel 49 and is transmitted through the optical thin films 41a and 41b of the dichroic prism 41.

The blue light B having passed through the dichroic mirror 27 passes through the relay lens 29 and is reflected by the mirror 31, and then passes through the relay lens 33 and is reflected by the mirror 35. Then, the blue light B passes through the condensing lens 43 and the liquid crystal display panel 45 and is reflected by the optical thin film 41b of the dichroic prism 41.

The red light R, green light G and blue light B all introduced to the dichroic prism 41 are composed into composed light 13A depending upon the optical transmission characteristic and the optical reflection characteristic of the optical thin films 41a and 41b. With the composed light 13A, information of images displayed by the liquid crystal display panels 53, 49 and 45 is projected in an enlarged scale on the rear face of the projection screen 102 through the projection lens 13.

Figure 11A:
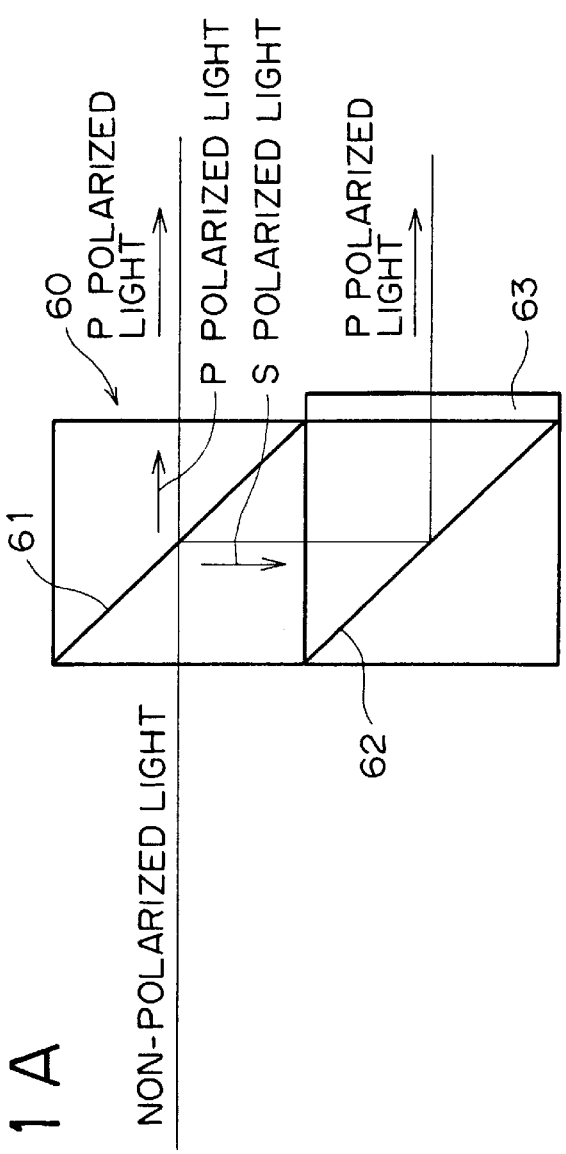
FIGS. 11A and 11B are schematic diagrammatic views showing an internal structure of a polarization conversion system and an optical path.

FIG. 11A shows a general configuration of the polarization conversion system 60 which can be adopted in the optical illumination system and the projection apparatus of the present invention. In FIG. 11A, only those components corresponding to light transmitted through a cell lens 21a of the first lens array are shown.

Referring to FIG. 11A, the polarization conversion system 60 includes a polarizing beam splitter 61 which transmits therethrough a P polarized light component of non-polarized light (random light) emitted from the light source but reflects an S polarized light component, a reflecting face 62 for reflecting the S polarized light component reflected from the polarizing beam splitter 61, and a λ/2 plate 63 for converting the S polarized light component reflected from the reflecting face 62 into P polarized light component.

Figure 11B:
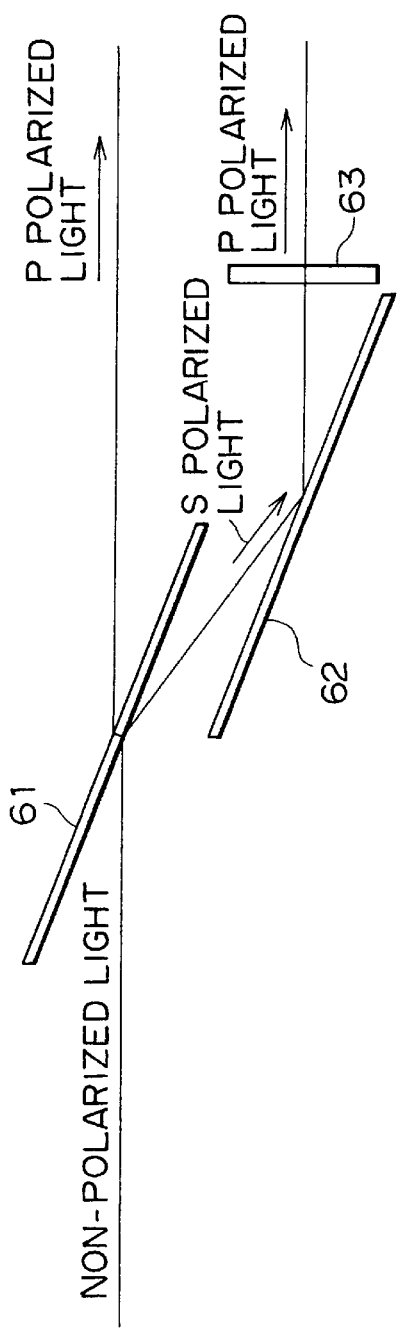

FIG. 11B shows another configuration of the polarization conversion system 60. The polarization conversion system 60 does not employ a polarizing prism, but is formed geometrically from an optical material in the form of a plate including a polarizing beam splitter 61, a reflecting plate 62 and a λ/2 plate 63. Consequently, the polarization conversion system 60 can be formed at a lower cost, but performs the same optical polarization conversion processing as that of the polarization conversion system 60 shown in FIG. 11A.

Figure 12A:
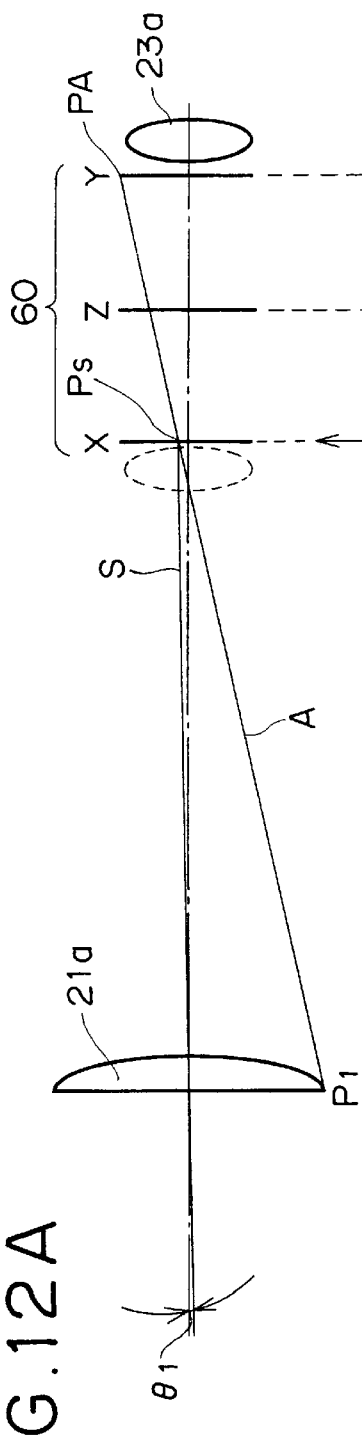
Figure 12B:
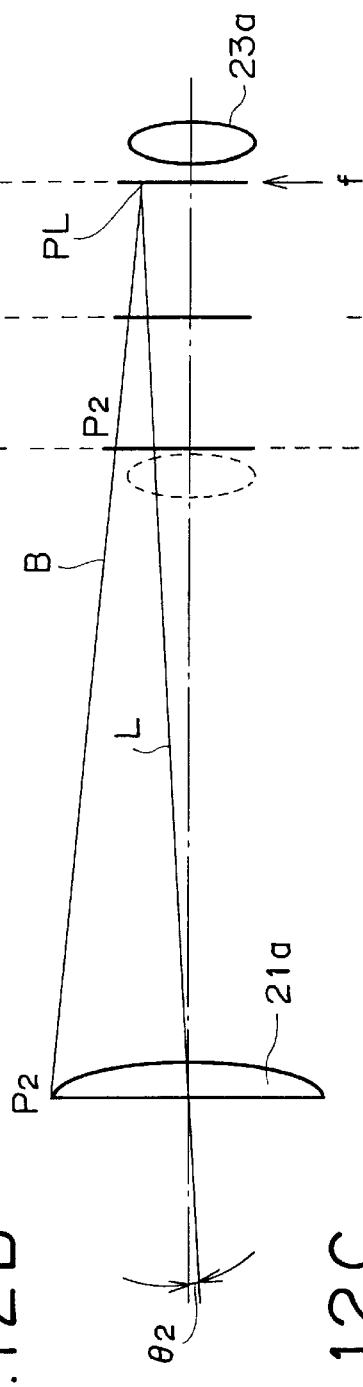
Figure 12C:
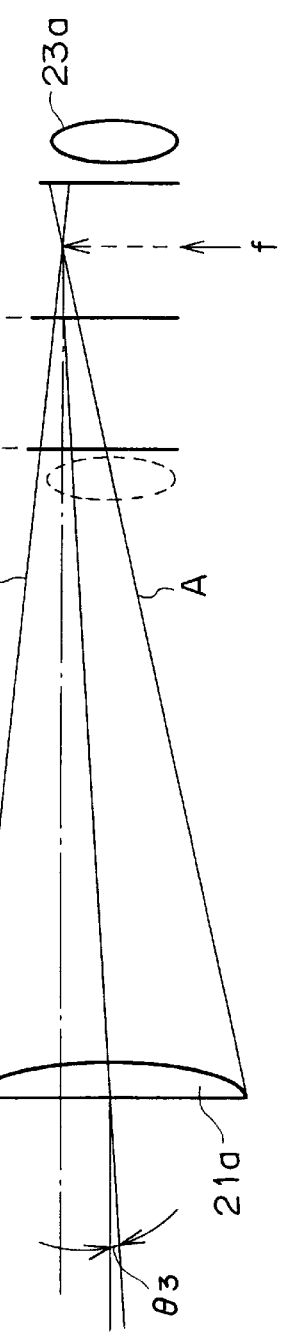

FIGS. 12A to 12C illustrate a focal position of a cell lens of the first lens array employed in the optical illumination system of the present invention.

Referring to FIGS. 12A to 12C, reference character 21a denotes a cell lens of the first lens array, and 23a denotes a cell lens of the second lens array.

Reference numeral 60 denotes aperture positions of different portions of the polarization conversion system 60 as shown in FIGS. 11A and 11B. In FIGS. 12A to 12C, an incoming aperture position x, an outgoing aperture position y and an incoming aperture position z of the reflecting plate 62 described hereinabove in connection with the polarization conversion system are indicated for the convenience of illustration.

For example, if the image forming position f of the cell lens 21a is set on the aperture x which is positioned nearest to the first lens array as seen in FIG. 12A, then the position at which an image of a luminous flux of the maximum convergence angle θ1 which can pass through the polarization conversion system 60 and the cell lens 23a is formed is, as shown in FIG. 12A, an intersection point Ps of a ray of light A interconnecting the bottom point P1 of the cell lens aperture of the cell lens 21a and the top point PA of the aperture y positioned nearest to the liquid crystal display element with the aperture position x which is nearest to the first lens array.

The angle θ1 defined by a ray of light S interconnecting the intersection point Ps and the center of the cell lens 21a of the first lens array and the optical axis is the maximum taking in divergence angle θ1 in this instance.

Further, if the image forming position f of the first lens array is set to the aperture position y positioned nearest to the liquid crystal display element, then the position at which an image of a luminous flux of the maximum convergence angle which can pass through the polarization conversion system and the second lens array is formed is, as shown in FIG. 12B, an intersection point PL of a ray of light B interconnecting the top point P2 of the cell lens aperture of the first lens array and the top point P2 of the aperture position x positioned nearest to the first lens array with the aperture position y which is nearest to the liquid crystal display element on an extension line of the ray of light B. The angle θ2 defined by a ray of light L interconnecting the intersection point PL and the center of the cell lens 21a of the first lens array and the optical axis is the maximum taking in divergence angle θ2 in this instance.

From the foregoing, in order to allow the configuration described above to take in a luminous flux of the largest divergence angle θ3, it is preferable to set the image forming position f of the cell lenses 21a of the first lens array at the intersection point between the ray of light A and the ray of light B as shown in FIG. 12C. The image forming position f of the first lens array is set within the range of $$S < f < L$$

where S is the optical path length of a shorter one of optical paths of P polarized light and S polarized light decomposed by the polarization conversion system 60 and L is the optical path length of a longer one of the optical paths.

FIG. 13 illustrates another arrangement wherein the polarization conversion system 60 is provided adjacent the liquid crystal display panel 49 which is a light valve with respect to the second lens array 23 while, in the embodiment described above, the polarization conversion system 60 is provided adjacent the light source with respect to the second lens array 23.

Referring to FIG. 13, the second optical block 2 includes two split lens array portions 23a and 23f, and the polarization conversion system 60 is interposed between the lens array portions 23a and 23f.

In the optical system described above, the second lens array is disposed at a position indicated by a broken line in FIGS 12A to 12C, and the condensing face 23f of the lens array 23 is positioned on the exit side of the polarization conversion system 60. Also in this instance, where the image forming position f of the first lens array 21 which forms the first optical block 1 is set so as to satisfy $S<f<L$ light emitted from the light source 3 can be taken in such that the divergence angle θ of light emitted from the light source 3 which can pass the first and second optical blocks and can pass through the polarization conversion system as described hereinabove with reference to FIGS. 12A to 12C may be in the maximum.

Figure 14A:
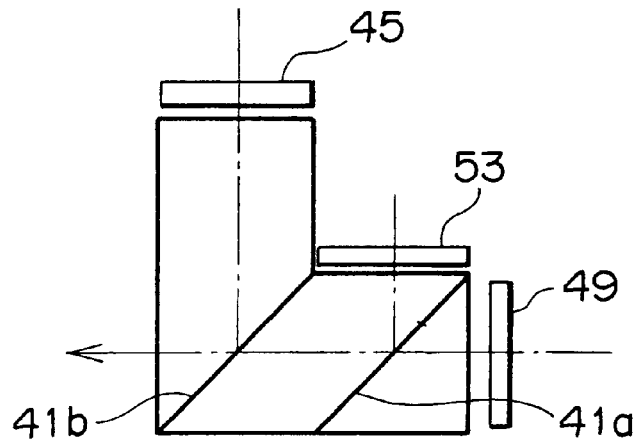
FIGS. 14A and 14B are plan views showing different forms of a dichroic prism.
Figure 14B:
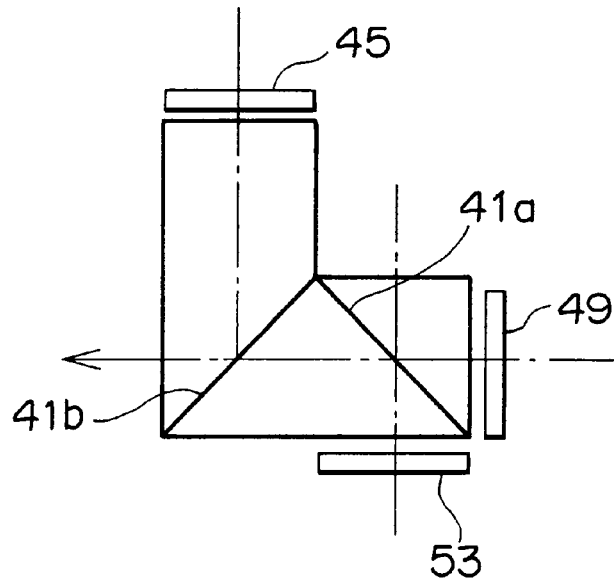

FIGS. 14A and 14B show different forms of the dichroic prism 41 which can be employed in the optical illumination system of the present invention.

It is to be noted that, in FIGS. 14A and 14B, like reference characters to those of the dichroic prism shown in FIG. 10 denote like elements.

Also where such a color composing prism as shown in FIG. 14A or 14B is used, the optical illumination system and the projection apparatus of the present invention can achieve similar effects to those described hereinabove.

The present invention is not limited to the embodiment described above.

The optical illumination system of the embodiment described above is formed as an optical illumination system particularly of the back projection type and of the so-called three-plate type which includes three liquid crystal display panels. However, the present invention can be applied not only to an optical illumination system of the type described above but also to an optical illumination system of the single plate type which includes a single liquid crystal display panel or the like.

Further, not only a liquid crystal display panel but also a display panel of any other type can be used as the light valve or the optical modulating element.

Figure 15:
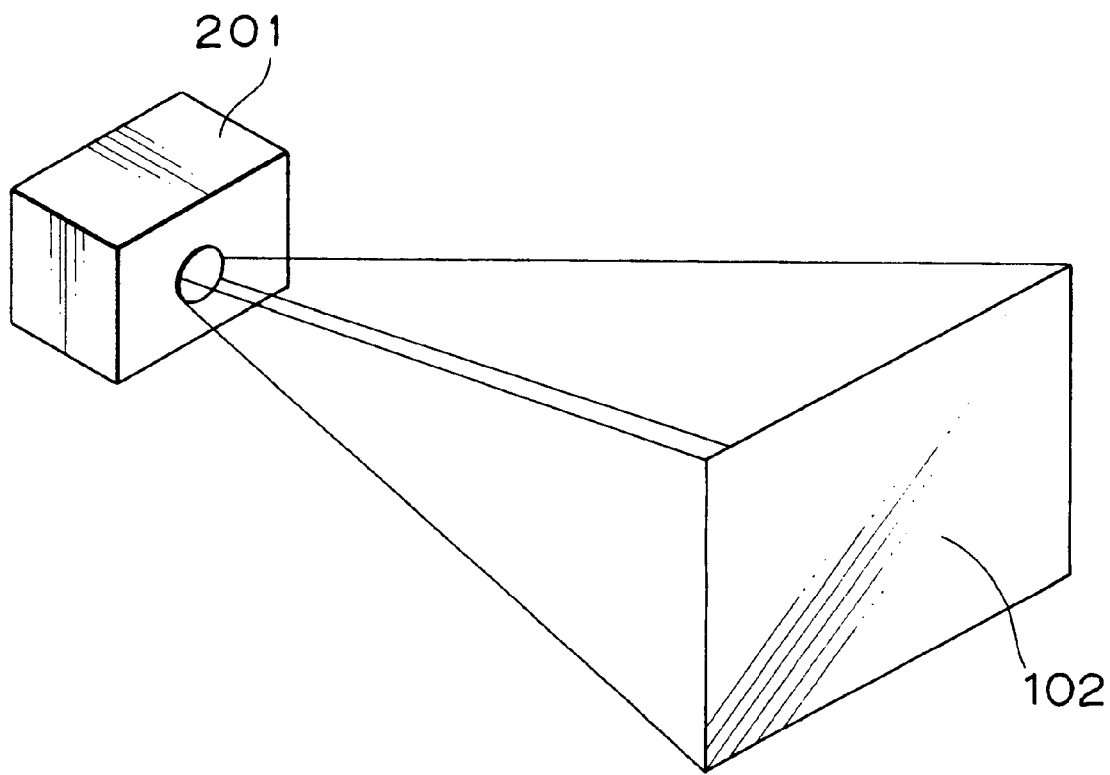
FIG. 15 is a schematic view of a display apparatus of the front type which projects an image directly to a screen.

Furthermore, the present invention can be applied also to a projector of the type called front projector wherein the projection apparatus 201 projects light directly to the screen from the front face side of the screen 102 as shown in FIG. 15.

Figure 16:
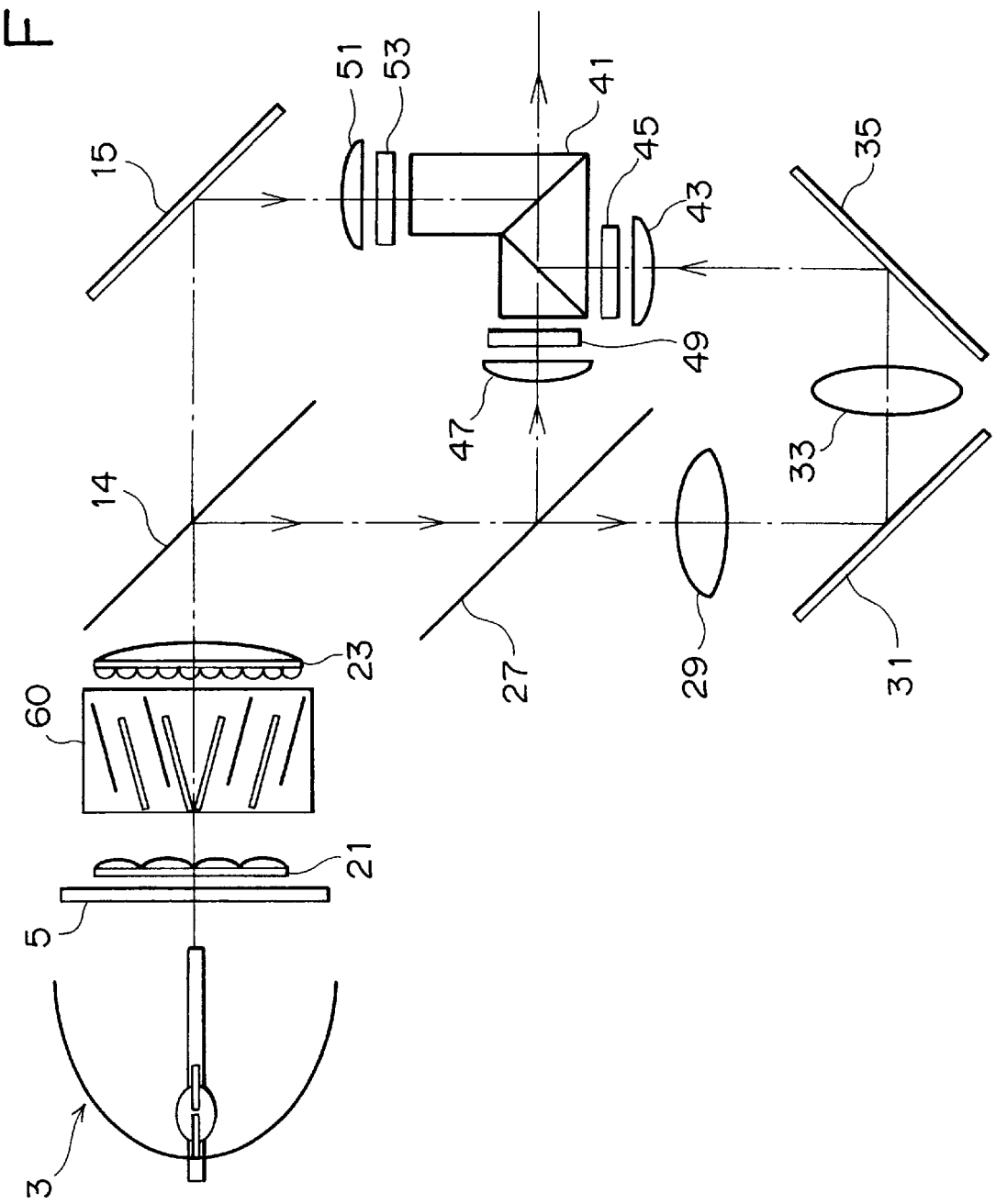
FIG. 16 is a schematic diagrammatic view showing another arrangement of an optical system of a projection apparatus according to the present invention

FIG. 16 shows another form of the optical illumination system of the present invention. In FIG. 16, like elements to those of FIG. 10 are denoted by like reference characters, and overlapping description of them is omitted herein to avoid redundancy. The optical illumination system of FIG. 16 employs a color composing prism having such a dichroic prism configuration as described hereinabove with reference to FIG. 14 and employs such a polarizing plate in the form of a plate as shown in FIG. 11B as the polarization conversion system 60.

While preferred embodiments of the present invention have been described using specific terms, such description is for illustrative purposes only, and it is to be understood that changes and variations may be made without departing from the spirit or scope of the following claims.

What is claimed is:

1. An optical illumination system, comprising:
a light source and a first lens array having a plurality of cell lenses upon which a luminous flux from said light source is irradiated;
a second lens array corresponding to said first lens array and having a plurality of cell lenses; and
a polarization conversion system disposed on a side of said second lens array facing said light source;
said cell lenses of said first lens array having an image forming position f which satisfies $S<f<L$ where L is an optical path length of a longer one of optical paths of P polarized light and S polarized light from said first lens array to said second lens array produced from an optical path of the luminance flux bent by said polarization conversion system and S is an optical path length of a shorter one of the optical paths.

2. An optical illumination system, comprising:
a light source and a first lens array having a plurality of cell lenses upon which a luminous flux from said light source is irradiated;
a second lens array corresponding to said first lens array and having a plurality of cell lenses; and
a polarization conversion system disposed remotely from said light source and adjacent said second lens array;
said cell lenses of said first lens array having an image forming position f which satisfies $S<f<L$ where L is an optical path length of a longer one of optical paths of P polarized light and S polarized light from said first lens array to an outgoing face of said polarization conversion system produced from an optical path of the luminance flux bent by said polarization conversion system and S is an optical path length of a shorter one of the optical paths.

3. An optical illumination system according to claim 1 or 2, wherein said pluralities of cell lenses are formed in a shape similar to that of a light valve.

4. An optical illumination system according to claim 1 or 2, wherein said polarization conversion system includes a polarizing beam splitter of the prism type, a mirror of the triangular prism type, and a half-wave plate.

5. An optical illumination system according to claim 1 or 2, wherein said polarization conversion system includes a polarizing beam splitter in the form of a plate, a mirror plate and a half-wave plate.

6. A projection apparatus, comprising:
an optical illumination system according to claim 1 or 2;
means for decomposing light outputted from said optical illumination system into lights of primary colors;
a light valve for modulating each of the lights of the three primary colors with a video signal; and
a screen to which the modulated lights of the primary colors are projected.

* * * * *